United States Patent
Kim et al.

(10) Patent No.: US 9,825,274 B2
(45) Date of Patent: *Nov. 21, 2017

(54) ELECTRODE ASSEMBLY AND RECHARGEABLE BATTERY HAVING ELECTRODE TAB

(71) Applicant: Samsung SDI Co., Ltd., Yongin-si, Gyeonggi-do (KR)

(72) Inventors: Yu-Na Kim, Yongin-si (KR); Jang-Ho Yoon, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 45 days.

This patent is subject to a terminal disclaimer.

(21) Appl. No.: 14/969,823

(22) Filed: Dec. 15, 2015

(65) Prior Publication Data

US 2016/0218345 A1    Jul. 28, 2016

(30) Foreign Application Priority Data

Jan. 28, 2015 (KR) .................. 10-2015-0013816

(51) Int. Cl.
*H01M 2/26* (2006.01)
*H01M 10/04* (2006.01)

(52) U.S. Cl.
CPC ....... *H01M 2/263* (2013.01); *H01M 10/0431* (2013.01); *H01M 2220/20* (2013.01)

(58) Field of Classification Search
CPC ............. H01M 2/263; H01M 10/0409; H01M 10/0431; H01M 10/0587; H01M 4/70; H01M 10/052; H01M 10/0413

See application file for complete search history.

(56) References Cited

U.S. PATENT DOCUMENTS 2,187,466 A    1/1940   Stratford
6,746,796 B2*  6/2004   Watanabe ............ H01M 2/263
                                          29/623.1

(Continued)

FOREIGN PATENT DOCUMENTS

EP    1 207 565 A2    5/2002
JP    2011-171079 A   9/2011

OTHER PUBLICATIONS

Extended European Search Report (EESR) dated Oct. 7, 2016 for European Patent Application No. EP 16 150 338.8 which shares priority of Korean Patent Application No. KR 10-2015-0013814 with U.S. Appl. No. 14/969,803, which is related to Subject U.S. Appl. No. 14/969,823.

(Continued)

*Primary Examiner* — Stewart Fraser
(74) *Attorney, Agent, or Firm* — Knobbe Martens Olson & Bear LLP

(57) ABSTRACT

An electrode assembly and a rechargeable battery having electrode tab are disclosed. In one aspect, the electrode assembly includes a first electrode and a second electrode which are wound with a separator placed therebetween The first electrode includes a first coated portion coated with an active material and a plurality of first electrode tabs T1-Tn protruding outwardly from the first coated portion, wherein n is a natural number greater than 1. The first electrode, when spread in a plane form, includes first to nth portions on which the first electrode tabs T1-Tn are respectively formed, wherein the first and nth portions of the first electrode respectively define the innermost and outermost portions thereof. Each of the first electrode tabs T1-Tn includes at least one tab, and wherein the number of the first electrode tab Tn is different from the number of each of the first electrode tabs T1-Tn-1.

20 Claims, 7 Drawing Sheets

(56) References Cited

U.S. PATENT DOCUMENTS

| 8,702,818 | B2* | 4/2014 | Sohn | H01M 2/22 |
| | | | | 29/623.1 |
| 9,012,053 | B2* | 4/2015 | Chun | H01M 2/023 |
| | | | | 429/122 |
| 2009/0239133 | A1 | 9/2009 | Kosugi | |
| 2016/0218343 | A1* | 7/2016 | Kim | H01M 10/0409 |
| 2016/0218344 | A1* | 7/2016 | Kim | H01M 2/263 |

OTHER PUBLICATIONS

Partial European Search Report dated May 18, 2016 for European Patent Application No. EP 16 150 338.8 which shares priority of Korean Patent Application No. KR 10-2015-0013814, filed Jan. 28, 2015, with U.S. Appl. No. 14/969,803, which is related to subject U.S. Appl. No. 14/969,823.

* cited by examiner

ELECTRODE ASSEMBLY AND RECHARGEABLE BATTERY HAVING ELECTRODE TAB

CROSS-REFERENCE TO RELATED APPLICATION

This application claims priority to and the benefit of Korean Patent Application No. 10-2015-0013816 filed in the Korean Intellectual Property Office on Jan. 28, 2015, the entire contents of which are incorporated herein by reference.

This application relates to U.S. patent applications entitled "ELECTRODE ASSEMBLY AND RECHARGEABLE BATTERY HAVING ELECTRODE TAB" application Ser. No.14/969803and "ELECTRODE ASSEMBLY AND RECHARGEABLE BATTERY HAVING ELECTRODE TAB" application Ser. No.14/969810, which are concurrently filed on the same date as this application and incorporated herein by reference in their entirety.

BACKGROUND

Field

The described technology generally relates to an electrode assembly and a secondary battery including the electrode assembly.

Description of the Related Technology

A rechargeable (or secondary) battery can be charged and discharged multiple times, unlike a primary battery. A low-capacity rechargeable battery is used for small portable electronic devices, such as a portable phone, a smartphone, a tablet computer, a notebook computer, and a camcorder. A high-capacity rechargeable battery (most often used with an array of batteries or battery cells) is widely used as a power source for driving a motor for a hybrid vehicle or an electric vehicle.

Recently, a high-output rechargeable battery using a non-aqueous electrolyte solution with high energy density has been developed. The high-output rechargeable battery is configured as a high-capacity rechargeable battery in which a plurality of rechargeable batteries are connected in series so as to be used in driving a device requiring high power, for example, a motor for an electric vehicle.

In addition, one high-capacity rechargeable battery is generally composed of a plurality of rechargeable batteries which are connected in series, and the rechargeable battery may have a cylindrical or angular shape. In addition, the rechargeable battery has an electrode assembly implementing charging and discharging. The electrode assembly includes a positive electrode, a negative electrode, and a separator interposed between the positive and negative electrodes. The electrode assembly is often formed with a structure in which a plurality of positive electrode plates and negative electrode plates are stacked or a structure in which band-shaped positive and negative electrodes are wound.

SUMMARY OF CERTAIN INVENTIVE ASPECTS

One inventive aspect relates to an electrode assembly and a secondary battery having an electrode tab.

Another aspect is an electrode assembly capable of being easily wound, and a rechargeable battery including the same.

Another aspect is an electrode assembly in which a first electrode and a second electrode are wound with a separator placed therebetween, wherein the first electrode includes a first coated portion coated with an active material and a plurality of first electrode tabs not coated with an active material and protruding outward of the first coated portion, and wherein the first electrode tab includes at least one tab, the first electrode tab Tn placed at the outermost side in the electrode assembly being different from the other first electrode tabs T1-Tn−1 in light of the number of tabs.

The first electrode tab Tn placed at the outermost side in the electrode assembly may include a plurality of tabs spaced apart from each other in a lateral direction, and the electrode tabs T1-Tn−1 of from the first electrode tab T1 placed at an innermost side to the first electrode Tn−1 placed second from the outside in the electrode assembly may have one tab.

The tabs of the first electrode tab Tn placed at the outermost side in the electrode assembly may be spaced apart from each other at a distance and do not overlap each other.

The tabs of the first electrode tab Tn placed at the outermost side in the electrode assembly may be welded to the first electrode tab Tn−1 placed second from the outside on the same plane in the wound electrode assembly.

The distance between the tabs of the first electrode tab Tn placed at the outermost side in the electrode assembly may be 0.5 to 5 mm, and the tab of the first electrode tab Tn placed at the outermost side may have a smaller width than the tabs of the other first electrode tabs T1-Tn−1 in the electrode assembly.

Each of the first electrode tabs T1-Tn−1 of from the first electrode tab T1 placed at the innermost side to the first electrode tab Tn−1 placed second from the outside in the electrode assembly may include a plurality of tabs spaced apart from each other in a lateral direction, and the first electrode tab Tn placed at the outermost side in the electrode assembly may have one tab.

The distance between the tabs of each of the first electrode tabs T1-Tn−1 of from the first electrode tab T1 placed at the innermost side to the first electrode tab Tn−1 placed second from the outside in the electrode assembly may be 0.5 to 5 mm.

The tab of the first electrode tab Tn placed at the outermost side in the electrode assembly may have a greater width than the tab of each of the other first electrode tabs T1-Tn−1.

Another aspect is a rechargeable battery, including: an electrode assembly in which a first electrode and a second electrode are wound with a separator placed therebetween; a case containing the electrode assembly; and a cam plate combined with the case, wherein the first electrode includes a first coated portion coated with an active material and a plurality of first electrode tabs not coated with an active material and protruding outward of the first coated portion, and wherein the first electrode tab Tn placed at the outermost side in the electrode assembly is different from the other first electrode tabs T1-Tn−1 in light of the number of tabs.

The first electrode tab Tn placed at the outermost side in the electrode assembly may include a plurality of tabs spaced apart from each other in a lateral direction, and the first electrode tabs T1-Tn−1 of from the first electrode tab T1 placed at the innermost side to the first electrode Tn−1 placed second from the outside in the electrode assembly may have one tab.

The tabs of the first electrode tab Tn placed at the outermost side in the electrode assembly are spaced apart from each other and do not overlap each other, and the tabs of the first electrode tab Tn placed at the outermost side in the electrode assembly may be welded to the tab of the first electrode tab Tn−1 placed second from the outside on the same plane in the wound electrode assembly.

The distance between the tabs of the first electrode tab Tn placed at the outermost side in the electrode assembly may be 0.5 to 5 mm, and the tab of the first electrode tab Tn placed at the outermost side of the electrode assembly may have a smaller width than the tab of each of the other first electrode tabs T1-Tn−1.

Each of the first electrode tabs T1-Tn−1 of from the first electrode tab T1 placed at the innermost side to the first electrode tab Tn−1 placed second from the outside in the electrode assembly may include a plurality of tabs spaced apart from each other in a lateral direction, and the first electrode tab Tn placed at the outermost side in the electrode assembly may have one tab.

The tab of the first electrode tab Tn placed at the outermost side in the electrode assembly may have a greater width than the tab of each of the other first electrode tabs T1-Tn−1.

Another aspect is an electrode assembly for a secondary battery, comprising: a first electrode and a second electrode which are wound with a separator placed therebetween, wherein the first electrode includes a first coated portion coated with an active material and a plurality of first electrode tabs T1-Tn protruding outwardly from the first coated portion, wherein n is a natural number greater than 2, wherein the first electrode, when spread in a plane form, includes first to nth portions on which the first electrode tabs T1-Tn are respectively formed, wherein the first and nth portions of the first electrode respectively define innermost and outermost portions thereof, wherein each of the first electrode tabs T1-Tn includes at least one tab, and wherein the number of the first electrode tab Tn is different from the number of each of the first electrode tabs T1-Tn−1.

In the above electrode assembly, the first electrode tab Tn includes a plurality of tabs spaced apart from each other in a lateral direction, and wherein each of the electrode tabs T1-Tn−1 includes a single tab. In the above electrode assembly, the tabs of the first electrode tab Tn do not overlap each other. In the above electrode assembly, the tabs of the first electrode tab Tn are connected to the first electrode tab Tn−1 placed at the second outermost portion of the first electrode. In the above electrode assembly, the distance between the tabs of the first electrode tab Tn is in the range of about 0.5 mm to about 5 mm. In the above electrode assembly, each of the tabs of the first electrode tab Tn has a smaller width than the tab each of the other first electrode tabs T1-Tn−1.

In the above electrode assembly, the width of each of the first electrode tabs T1-Tn−1 is about 1.5 times to about 2.5 times the width of each of the tabs of the electrode tab Tn. In the above electrode assembly, each of the first electrode tabs T1-Tn−1 includes a plurality of tabs spaced apart from each other in a lateral direction, and wherein the first electrode tab Tn includes a single tab. In the above electrode assembly, the distance between the tabs of each of the first electrode tabs T1-Tn−1 is in the range of about 0.5 mm to about 5 mm. In the above electrode assembly, the tab of the first electrode tab Tn has a greater width than each of the tabs of the other first electrode tabs T1-Tn−1. In the above electrode assembly, the width of the tab of the first electrode tab Tn is about 1.5 times to about 2.5 times the width of each of the tabs of the electrode tabs T1-Tn−1.

Another aspect is a rechargeable battery, comprising: an electrode assembly including a first electrode and a second electrode that are wound with a separator placed therebetween; a case containing the electrode assembly; and a cap plate connected to the case, wherein the first electrode includes a first coated portion coated with an active material and a plurality of first electrode tabs T1-Tn protruding outwardly from the first coated portion, wherein n is a natural number greater than 2, wherein the first electrode, when spread in a plane form, includes first to nth portions on which the first electrode tabs T1-Tn are respectively formed, wherein the first and nth portions of the first electrode respectively define innermost and outermost portions thereof, wherein each of the first electrode tabs T1-Tn includes at least one tab, and wherein the number of the first electrode tab Tn is different from the number of each of the first electrode tabs T1-Tn−1.

In the above battery, the first electrode tab Tn includes a plurality of tabs spaced apart from each other in a lateral direction, and wherein each of the first electrode tabs T1-Tn−1 includes a single tab. In the above battery, the tabs of the first electrode tab Tn do not overlap each other. In the above battery, the tabs of the first electrode tab Tn are connected to the tab of the first electrode tab Tn−1 placed at the second outermost portion of the first electrode. In the above battery, the distance between the tabs of the first electrode tab Tn is in the range of about 0.5 mm to about 5 mm. In the above battery, each of the tabs of the first electrode tab Tn has a smaller width than the tab of each of the first electrode tabs T1-Tn−1. In the above battery, each of the first electrode tabs T1-Tn−1 includes a plurality of tabs spaced apart from each other in a lateral direction, and wherein the first electrode tab Tn includes a single tab. In the above battery, the tab of the first electrode tab Tn has a greater width than each of the tabs of the first electrode tabs T1-Tn−1. In the above battery, the width of the tab of the first electrode tab Tn is greater than the sum of the widths of the tabs of each of the first electrode tabs T1-Tn−1.

According to at least one of the disclosed embodiments, the point at which the winding of the electrode assembly is ended can be easily detected using the electrode tab placed at the outermost side of the electrode assembly.

DETAILED DESCRIPTION OF CERTAIN INVENTIVE EMBODIMENTS

Figure 1:
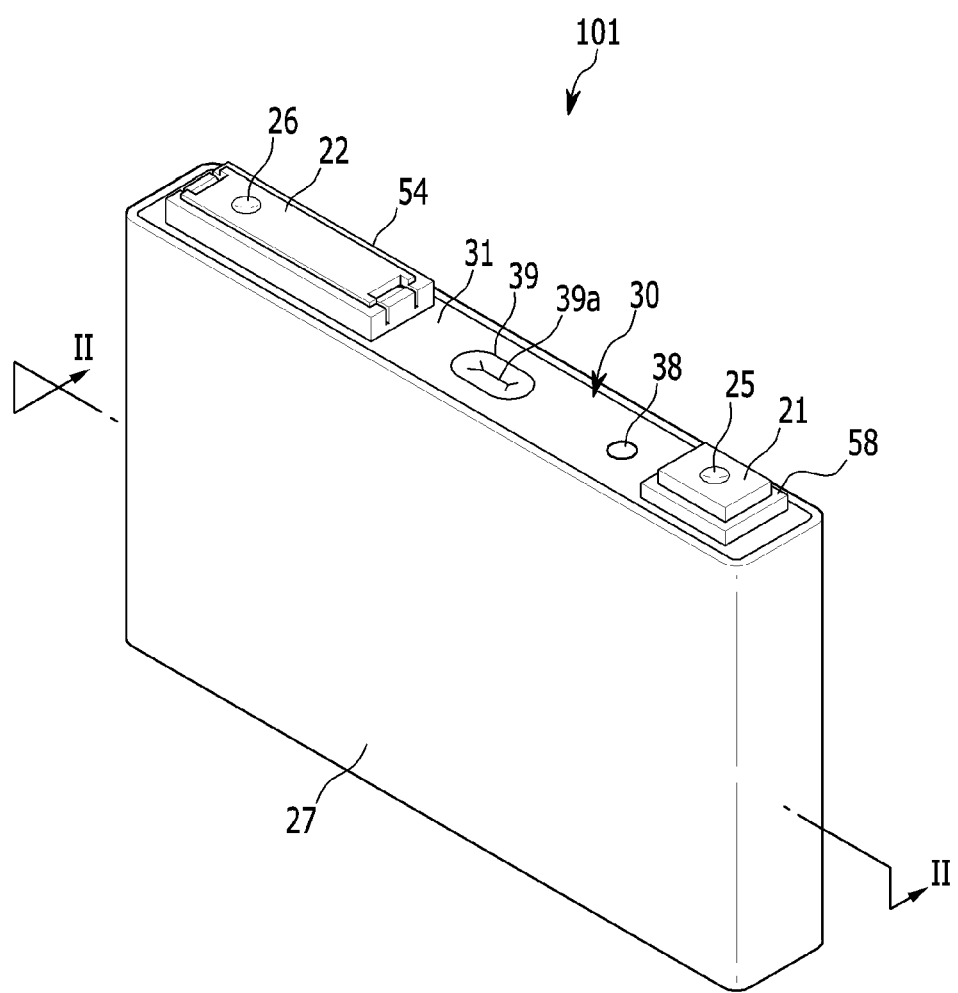
FIG. 1 is a perspective view showing a rechargeable battery according to a first embodiment.

Generally, in a secondary battery, it is important to align protruding electrode tabs when a positive electrode, a negative electrode, and a separator are stacked and wound, and to this end, a winding end point and a winding start point need to be accurately checked.

Embodiments will be described more fully hereinafter with reference to the accompanying drawings, in which exemplary embodiments of the invention are shown. However, the present invention may be embodied in many different forms, and is not limited to the exemplary embodiments described herein. In addition, like reference numerals refer to like elements throughout the specification and drawings. In this disclosure, the term "substantially" includes the meanings of completely, almost completely or to any significant degree under some applications and in accordance with those skilled in the art. Moreover, "formed on" can also mean "formed over." The term "connected" includes an electrical connection.

Figure 2:
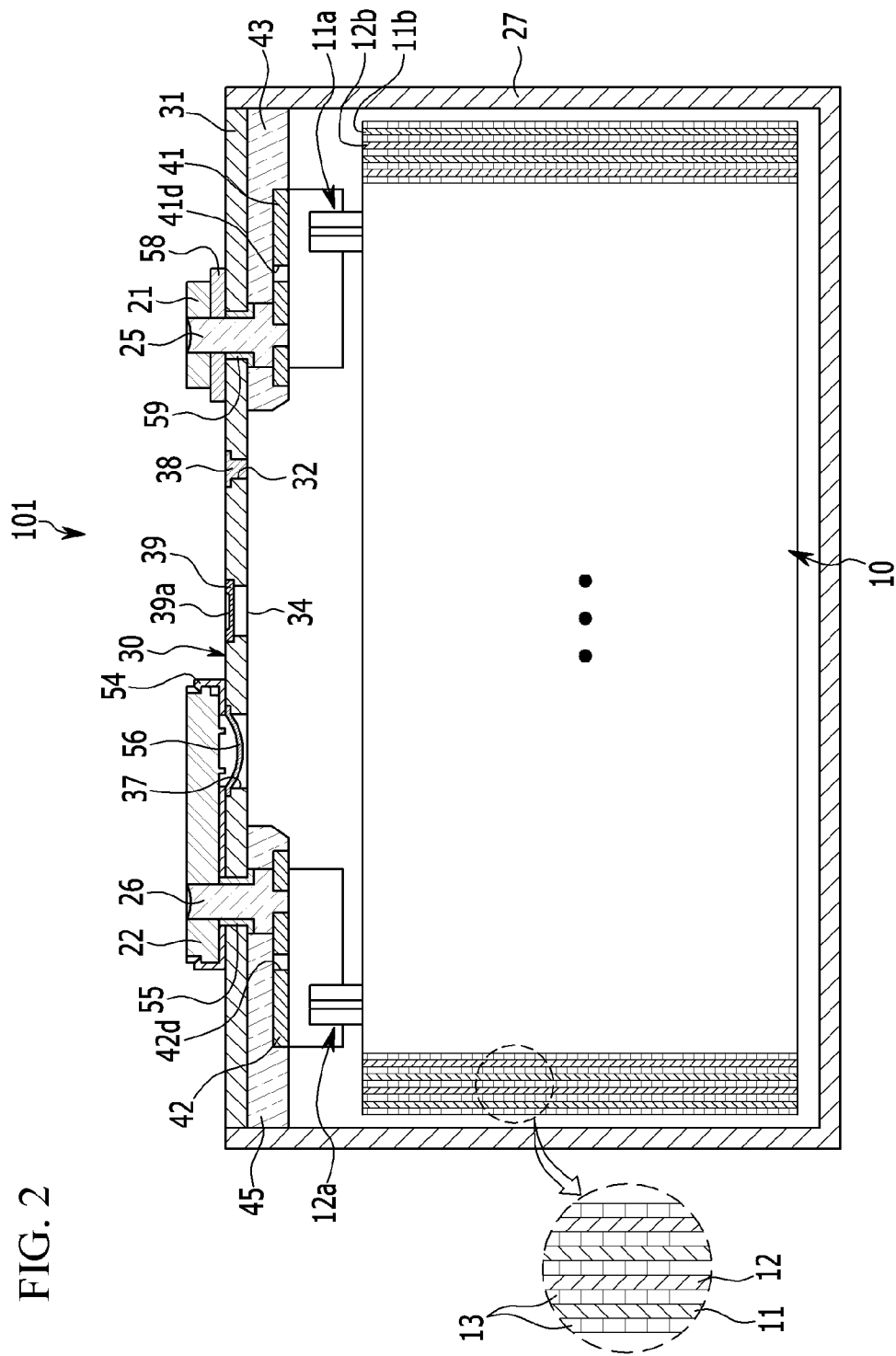
FIG. 2 is a cross-sectional view taken along line II-II in FIG. 1.

FIG. 1 is a perspective view showing a rechargeable battery 101 according to an embodiment, and FIG. 2 is a cross-sectional view taken along line II-II in FIG. 2.

Referring to FIGS. 1 and 2, the rechargeable battery 101 includes an electrode assembly 10 in which a positive electrode (first electrode) 11 and a negative electrode (second electrode) 12 are wound with a separator 13 interposed therebetween, a case 27 containing the electrode assembly 10, and a cap assembly 30 coupled to an opening of the case 27.

The rechargeable battery 101 will be described by exemplifying a lithium ion rechargeable battery with an angular shape. However, the present invention is not limited thereto, and may be applied to various types of batteries, such as a lithium polymer battery or a cylindrical shaped battery. In addition, the rechargeable battery 101 can be a high-output rectangular shaped battery, and may be formed as, particularly, a battery for powering a motor to start a vehicle. Since such battery requires momentary high power, a structure in which electrode tabs protrude upward is favorable, as in the present embodiment. However, it is very difficult to accurately align electrode tabs in cases of the structure in which the electrode tabs protrude upwardly. In order to accurately align the electrode tabs, a point at which winding is started and a point at which the winding is ended need to be accurately specified, and thus the electrode tabs can be accurately stacked without missing each other.

The case 27 can have a substantially cuboid shape, and an opening is formed in one surface thereof. The case 27 may be formed of a metal, such as aluminum or stainless steel.

The cap assembly 30 includes a cap plate 31 covering the opening of the case 27, a first terminal 21 protruding outwardly from the cap plate 31 and electrically connected to the positive electrode 11, and a second terminal 22 protruding outwardly from the cap plate 31 and electrically connected to the negative electrode 12.

The cap plate 31 can have a long plate shape that is lengthened in one direction, and is coupled to the opening of the case 27. The cap plate 31 is equipped with a sealing stopper 38, which is installed at an electrolyte inlet 32, and a vent plate 34, which is installed at a vent hole 39 and has a notch 39a which can be opened at a predetermined pressure. The first terminal 21 and the second terminal 22 are installed on the cap plate 31.

The first terminal 21 is electrically connected to the positive electrode 11 via a first current collecting member 41, and the second terminal 22 is electrically connected to the negative electrode 12 via a second current collecting member 42. However, the present invention is not limited thereto, and the first terminal 21 may be electrically connected to the negative electrode and the second terminal 22 may be electrically connected to the positive electrode.

The first terminal 21 can have a rectangular plate shape. The first terminal 21 is electrically connected to the positive electrode 11 via a connection terminal 25 bonded to the first current collecting member 41. The connection terminal 25 can have a pillar shape, and can be attached to the first terminal 21 by welding while an upper end of the connection terminal 25 is fitted into the first terminal 21. In addition, the upper end of the connection terminal 25 can be attached to the first current collecting member 41 by welding, and the first current collecting member 41 electrically connects the connection terminal 25 and the positive electrode 11.

A sealing gasket 59 for sealing is inserted in a hole through which the terminal passes, between the first terminal 21 and the cap plate 31, and a lower insulation member 43 supporting the first current collecting member 41 is formed below the cap plate 31.

A connection member 58 electrically connecting the first terminal 21 and the cap plate 31 is formed below the first terminal 21. Hence, the cap plate 31 and the case 27 are positively charged.

The second terminal 22 may be formed in a rectangular plate shape. The second terminal 22 is electrically connected to the negative electrode 12 via a connection terminal 26 bonded to the second current collecting member 42. An upper end of the connection terminal 26 is fixed to the second terminal 22 while passing through the first cap plate 31 and the second terminal 22.

The connection terminal 26 can have a pillar shape, and can be attached to the second terminal 22 while an upper end of the connection terminal 26 is fitted into the second terminal 22. In addition, the upper end of the connection terminal 26 can be attached to the second current collecting member 42 by welding, and the second current collecting member 42 electrically connects the connection terminal 26 and the negative electrode 12.

A sealing gasket 55 is inserted into a hole, through which the connection terminal 26 passes, between the second terminal 22 and the cap plate 31, and a lower insulation member 45 for insulating the second current collecting member 42 and the second terminal 22 from each other by the cap plate 31 is formed below the cap plate 31.

Meanwhile, a short circuit protrusion protruding toward a short circuit hole 37 is formed on a lower portion of the second terminal 22. The second terminal 22 is extended in one direction to cover the short circuit hole 37. An upper insulation member 54 electrically insulating the second terminal 22 and the cap plate 31 is formed between the second terminal 22 and the cap plate 31.

The cap assembly 30 includes the short circuit member 56 for short circuiting the positive electrode 11 and the negative electrode 12, the short circuit member 56 is electrically connected to the cap plate 31, and is transformed to be connected to the second terminal 22 when the inner pressure of the rechargeable battery 101 rises.

The cap plate 31 has the short circuit hole 37, and the short circuit member 56 is placed between the upper insulation member 54 and the cap plate 31 in the short circuit hole 37. In addition, the second terminal 22 is placed in the short circuit hole 37 to cover the short circuit hole 37. The short circuit member 56 includes a curved portion which is bent in an arc shape to be convex downward, and an edge portion formed outside the curved portion and fixed to the cap plate 31.

When a gas is generated due to an abnormal reaction inside the secondary rechargeable battery, the inner pressure of the secondary rechargeable battery rises. When the inner pressure of the secondary rechargeable battery is higher than the predetermined pressure, the curved portion is transformed to be convex upward, and the short circuit protrusion and the short circuit member 56 are touched to cause a short circuit.

Figure 3:
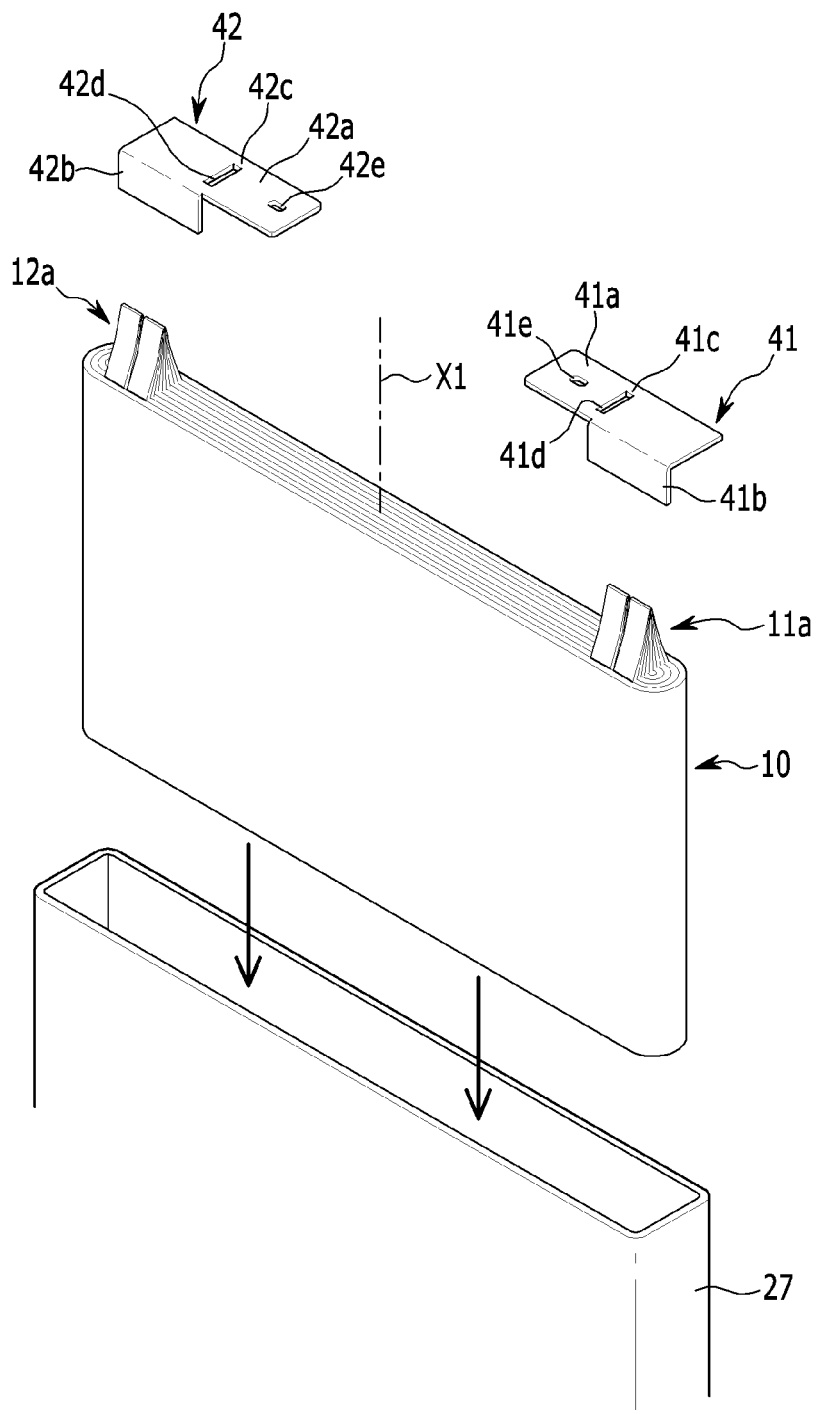
FIG. 3 is an exploded perspective view showing a part of the rechargeable battery according to the first embodiment.

FIG. 3 is an exploded perspective view showing a part of a rechargeable battery according to an embodiment.

Referring to FIGS. 2 and 3, the electrode assembly 10 includes a positive electrode 11, a negative electrode 12, and a separator 13 placed between the positive electrode 11 and the negative electrode 12, which have a band shape, and has a wound structure. The electrode assembly 10 is wound around a winding axis (x1) while the separator 13 is interposed between the positive and negative electrodes 11 and 12, and then pressed to be flattened. The electrode assembly 10 includes one positive electrode 11, one negative electrode 12, and two separators 13.

The positive electrode 11 includes a positive electrode current collector, and a positive electrode active material layer coated on the positive electrode current collector. The positive electrode current collector may be formed of a metal thin plate of aluminum or the like, and the positive electrode active material layer may be formed of a lithium-based oxide. The negative electrode 12 includes a negative electrode current collector, and a negative electrode active material layer coated on the negative electrode current collector. The negative electrode current collector may be formed of a metal thin plate of copper or the like, and the negative electrode active material layer may be formed of a carbon-based active material. The separator 13 can be formed as a porous thin film, and may be formed of a polyolefin based resin.

A first non-coated portion 11a and a second non-coated portion 12a are formed on the electrode assembly 10 to protrude toward the cap plate. The first non-coated portion 11a and the second non-coated portion 12a are spaced apart from each other in a width direction of the electrode assembly 10.

The first current collecting member 41 includes an upper plate 41a bonded to the connection terminal 25, and an electrode attachment portion 41b bent toward the electrode assembly 10 and bonded to the first non-coated portion 11a. The electrode attachment portion 41b is bent from an end in a width direction of the upper plate 41a to be parallel with the electrode assembly 10.

The upper plate 41a can have a quadrangular plate shape, and is fixed to a lower portion of the connection terminal 25 by welding. The upper plate 41a has a coupling hole 41e, and the connection terminal 25 and the upper plate 41a are welded together while a protrusion formed on a lower portion of the connection terminal 25 is fitted into the coupling hole 41e.

The upper plate 41a includes a fuse 41c having a smaller cross-sectional area compared with the periphery. A fuse hole 41d is formed in the fuse 41c, and thus the fuse 41c has a smaller vertical cross-sectional area compared with the periphery. The fuse hole 41d is formed in the center of the fuse 41c, and the fuse 41c is formed on both sides of the fuse hole 41d.

The second current collecting member 42 includes an upper plate 42a bonded to the connection terminal 26, and an electrode attachment portion 42b bent toward the electrode assembly 10 and bonded to the second non-coated portion 12a. The electrode attachment portion 42b is bent from an end in a width direction of the upper plate 42a to be parallel with the electrode assembly 10.

The upper plate 42a can have a quadrangular plate shape, and is fixed to a lower portion of the connection terminal 26 by welding. The upper plate 42a has a coupling hole 42e, and the connection terminal 26 and the upper plate 42a are welded together while a protrusion formed on a lower portion of the connection terminal 26 is fitted in the coupling hole 42e.

The upper plate 42a includes a fuse 42c having a smaller cross-sectional area compared with the periphery. A fuse hole 42d is formed in the fuse 42c, and thus the fuse 42c has a smaller vertical cross-sectional area compared with the periphery. The fuse hole 42d is formed in the center of the fuse 42c, and the fuse 42c is formed on both sides of the fuse hole 42d.

The positive electrode 11 includes a first coated portion 11b coated with a positive electrode active material layer, and a first non-coated portion 11a without a positive electrode active material layer. The first non-coated portion 11a includes first electrode tabs that are stacked. In addition, the negative electrode 12 includes a second coated portion 12b coated with a negative electrode active material, and a second non-coated portion 12a without a negative electrode active material. The second non-coated portion 12a includes second electrode tabs that are stacked.

Figure 4:
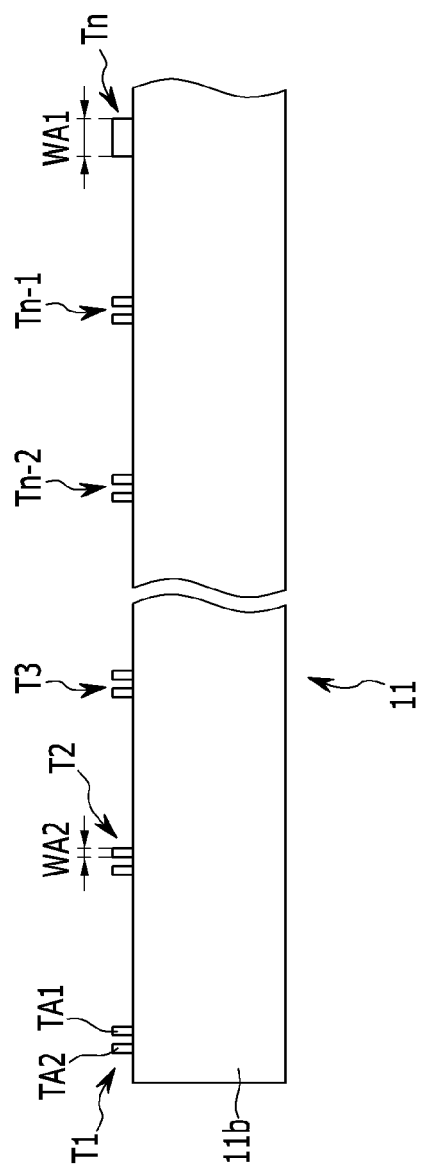
FIG. 4 is a developed plane view of a first electrode according to the first embodiment.

FIG. 4 is a developed plane view of a first electrode according to the first embodiment.

Referring to FIG. 4, the positive electrode 11 includes a plurality of first electrode tabs T1-Tn, and the first electrode tabs T1-Tn protrude upwardly from the first coated portion 11b.

The first electrode tabs T1-Tn are spaced apart from each other in a length direction of the positive electrode 11, and the distances between the first electrode tabs T1-Tn may be the same or form an arithmetic progression. As shown in FIG. 4, the first electrode tab T1 is placed at the innermost portion of the positive electrode 11 and the first electrode tab T2 is placed at the second innermost portion of the positive electrode 11. Similarly, the first electrode tab Tn is placed at the outermost portion of the positive electrode 11, and the first electrode tab Tn−1 is placed at the second outermost portion of the positive electrode 11. This applies to the first electrode tabs S1-Sn and positive electrode 15 shown in FIG. 6

The first electrode tab Tn can be different from the other first electrode tabs T1-Tn−1 in terms of the number of tabs. In some embodiments, each of the first electrode tabs T1-Tn−1 have a plurality of tabs TA1 and TA2. The tabs TA1 and TA2 are spaced apart from each other at a distance in a lateral direction. Two tabs TA1 and TA2 may form each of the first electrode tab T1-Tn−1, and the two tabs TA1 and TA2 constituting each of the first electrode tabs T1-Tn−1 are welded to the first electrode tab Tn placed at the outermost side.

However, the present invention is not limited thereto, and each of the electrode tabs T1-Tn−1 can include three or more tabs.

Each of the first electrode tabs T1-Tn−1 may have a slit, and the slit distance may be about 0.5 mm to about 5 mm. However, depending on the embodiments, the slit distance may be less than about 0.5 mm or greater than about 5 mm (this applies to the slit distance described below with respect to FIGS. 5-7). The tabs TA1 and TA2 constituting each of the first electrode tabs T1-Tn−1 may not overlap each other on the same plane. However, the tabs TA1 and TA2 of different first electrode tabs T1-Tn−1 can overlap each other on different planes. In addition, the tabs TA1 and TA2 of the first electrode tabs T1-Tn−1 can be welded to at least partially overlap the first electrode tab Tn.

The first electrode tab Tn can include only one tab or a different number of tabs compared with the remaining electrode tabs T1-Tn−1. In addition, the tab of the first electrode tab Tn can have a different width from each of the tabs of the other electrode tabs T1-Tn−1, and the width WA1 of the tab of the first electrode tab Tn can be greater than the width WA2 of each of the tabs TA1 and TA2 of the other electrode tabs T1-Tn−1. The width WA1 of the tab of the first electrode tab Tn can be about 1.5 times to about 2.5 times the width WA2 of each of the tabs TA1 and TA2 of the other electrode tabs T1-Tn−1.

Since the first electrode tab Tn is different from the other first electrode tabs T1-Tn−1 in terms of the number of tabs, the winding end point and the winding end point can be accurately measured by recognizing the first electrode tab Tn placed at the outermost portion of the positive electrode 11. That is, the winding apparatus may measure the number of first electrode tabs T1-Tn using a photo-sensor or the like. If a gap is determined to be absent in the electrode tab, the winding apparatus may recognize the sensed first electrode tab Tn as being a tab placed at the outermost side and thus specify the position at which the winding is to be ended. Therefore, the winding of one electrode assembly 10 can be accurately and promptly ended, and the winding of another electrode assembly 10 can be started at the accurate position.

Figure 5:
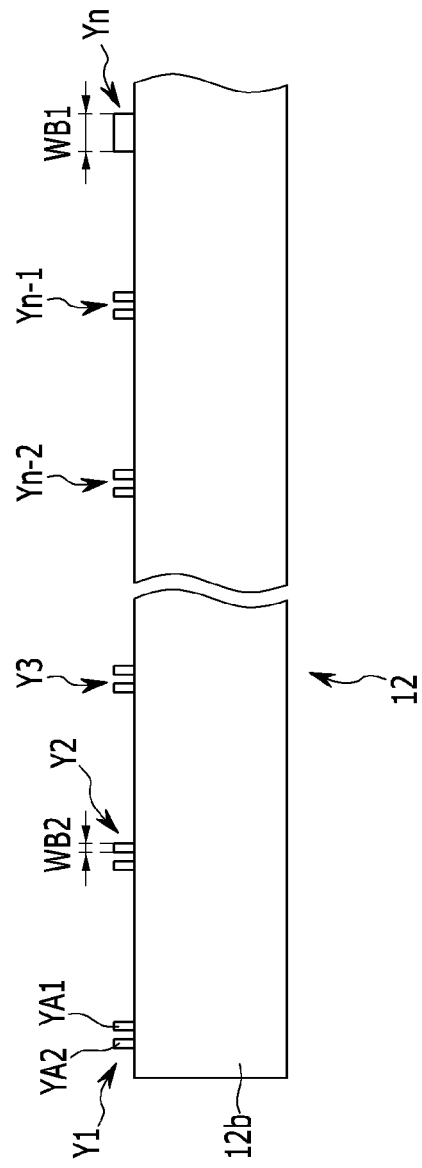
FIG. 5 is a developed plane view of a second electrode according to the first embodiment.

FIG. 5 is a developed plane view of a second electrode according to the first embodiment.

Referring to FIG. 5, the negative electrode 12 includes a plurality of second electrode tabs Y1-Yn, and the second electrode tabs Y1-Yn protrude upwardly from the second coated portion 12b. The second electrode tabs Y1-Yn are spaced apart from each other in a length direction of the negative electrode 12, and the distances between the second electrode tabs Y1-Yn may be the same or form an arithmetic progression. As shown in FIG. 5, the second electrode tab Y1 is placed at the innermost portion of the negative electrode 12 and the second electrode tab Y2 is placed at the second innermost portion of the negative electrode 12. Similarly, the second electrode tab Yn is placed at the outermost portion of the negative electrode 12, and the second electrode tab Yn−1 is placed at the second outermost portion of the negative electrode 12. This applies to the second electrode tabs Z1-Zn and negative electrode 16 shown in FIG. 7.

The second electrode tab Yn can be different from the other second electrode tabs Y1-Yn−1 in terms of the number of tabs. In some embodiments, each of the second electrode tabs Y1-Yn−1 includes a plurality of tabs YA1 and YA2. The tabs YA1 and YA2 are spaced apart from each other at a distance in a lateral direction. Two tabs YA1 and YA2 may form each of the second electrode tabs Y1-Yn−1, and the two tabs YA1 and YA2 constituting each of the second electrode tabs Y1-Yn−1 are welded to the second electrode tab Yn placed at the outermost side.

However, the present invention is not limited thereto, and each of the electrode tabs T1-Tn−1 of from the second electrode tab Y1 placed at the innermost side to the second electrode tab Yn−1 placed second from the outside in the electrode assembly 10 can include three or more tabs.

Each of the second electrode tabs Y1-Yn−1 may have a slit, and the slit distance may be about 0.5 mm to about 5 mm. The tabs YA1 and YA2 constituting each of the second electrode tabs Y1-Yn−1 may not overlap each other on the same plane. However, the tabs YA1 and YA2 of different second electrode tabs Y1-Yn−1 can overlap each other on different planes. The tabs YA1 and YA2 of the second electrode tabs Y1-Yn−1 can be welded to at least partially overlap the second electrode tab Yn placed at the outermost side in the electrode assembly 10.

The second electrode tab Yn can include only one tab or a different number of tabs compared with the remaining electrode tabs T1-Tn−1. The tab of the second electrode tab Yn can have a different width from each of the tabs of the other electrode tabs Y1-Yn−1. The width WB1 of the tab of the first electrode tab Yn can be greater than the width WB2 of each of the tabs YA1 and YA2 of the other electrode tabs T1-Tn−1. The width WB1 of the tab of the second electrode tab Yn can be about 1.5 times to about 2.5 times the width WB2 of each of the tabs TA1 and TA2 of the other electrode tabs Y1-Yn−1.

Since the second electrode tab Yn is different from the other second electrode tabs Y1-Yn−1 in terms of the number of tabs, the winding end point and the winding start point can be accurately measured by recognizing the second electrode tab Yn placed at the outermost side.

Figure 6:
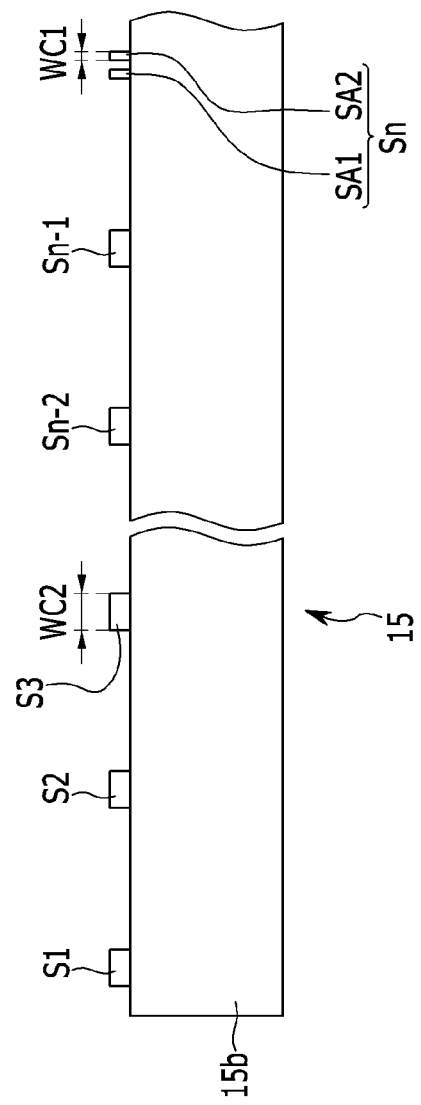
FIG. 6 is a developed plane view of a first electrode according to a second embodiment.

FIG. 6 is a developed plane view of a first electrode according to a second embodiment.

Referring to FIG. 6, a positive electrode 15 includes a plurality of first electrode tabs S1-Sn, and the first electrode tabs S1-Sn protrude upwardly from a first coated portion 15b.

The first electrode tabs S1-Sn are spaced apart from each other in a length direction of the positive electrode 15, and the distances between the first electrode tabs S1-Sn may be the same or form an arithmetic progression. As shown in FIG. 6, the first electrode tab S1 is placed at the innermost portion of the positive electrode 15 and the first electrode tab S2 is placed at the second innermost portion of the positive electrode 15. Similarly, the first electrode tab Sn is placed at the outermost portion of the positive electrode 15, and the first electrode tab Sn−1 is placed at the second outermost portion of the positive electrode 15.

The first electrode tab Sn can be different from the other first electrode tabs S1-Sn−1 in terms of the number of tabs. In some embodiments, each of the electrode tabs S1-Sn−1 includes a plurality of tabs SA1 and SA2.

The tabs SA1 and SA2 of the first electrode tab Sn placed at the outermost side are spaced apart from each other at a distance in a lateral direction. Two tabs SA1 and SA2 may form one first electrode tab Sn, and the two tabs SA1 and SA2 constituting one first electrode tabs Sn can be welded to the first electrode tabs Sn−1 placed second from the outside side in the electrode assembly.

However, the present invention is not limited thereto, and the first electrode tab Sn placed at the outermost side in the electrode assembly 10 can include three or more tabs.

The first electrode tab Sn placed at the outermost side may have a slit, and the slit distance may be about 0.5 mm to about 5 mm. Meanwhile, the tabs SA1 and SA2 constituting one first electrode tab Sn do not overlap each other on the same plane.

Each of the tabs SA1 to SA2 of the first electrode tab Sn can have a different width from the tab of each of the other electrode tabs Y1-Yn−1. For example, the width WC1 of each of the tabs SA1 to SA2 of the first electrode tab Sn is less than the width WC2 of the tab of each of the other first electrode tabs S1-Sn−1. The width WC2 of the tab of each of the other first electrode tabs Sn-Sn−1 can be about 1.5 times to about 2.5 times the width WC2 of each of the tabs SA1 and SA2 of the first electrode tab Sn placed at the outermost side.

Since the first electrode tab Sn placed at the outermost side is different from the other first electrode tabs S1-Sn−1 in terms of the number of tabs, the winding end point and the winding start point can be accurately measured by recognizing the first electrode tab Sn placed at the outermost side.

In addition, the widths of the tabs are detected to recognize the electrode tab Sn placed at the outermost side.

Figure 7:
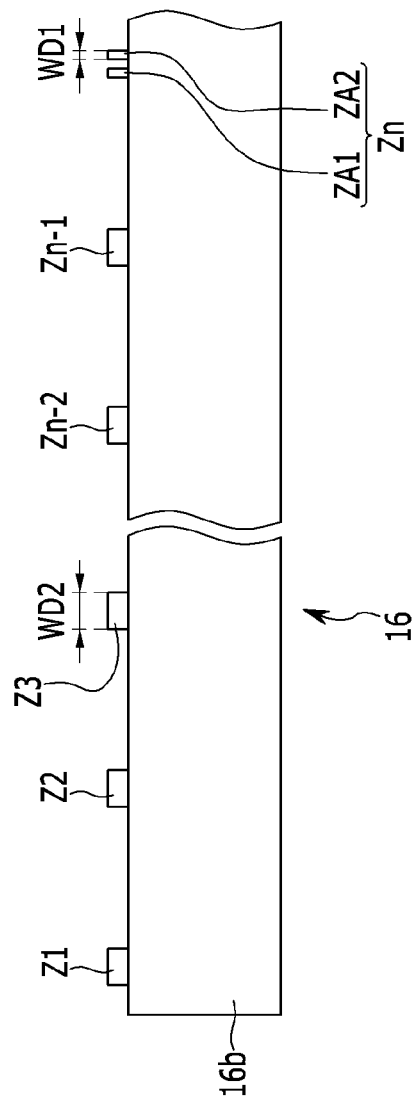
FIG. 7 is a developed plane view of a second electrode according to the second embodiment.

FIG. 7 is a developed plane view of a second electrode according to the second embodiment.

Referring to FIG. 7, a negative electrode 16 includes a plurality of second electrode tabs Z1-Zn, and the second electrode tabs Z1-Zn protrude upward from the second coated portion 16b.

The second electrode tabs Z1-Zn are spaced apart from each other in a length direction of the negative electrode 16, and the distances between the second electrode tabs Z1-Zn may be the same or form an arithmetic progression.

The second electrode tab Zn can be different from the other first electrode tabs Z1-Zn−1 in terms of the number of tabs. For example, each of the second electrode tabs Z1-Zn−1 includes one tab, and the second electrode Zn includes a plurality of tabs ZA1 and ZA2.

The tabs ZA1 and ZA2 of the second electrode tab Zn are spaced apart from each other at a distance in a lateral direction. Two tabs ZA1 and ZA2 may form one second electrode tab Zn, and the two tabs ZA1 and ZA2 constituting one second electrode tab Zn can be welded to the second electrode tab Zn−1.

However, the present invention is not limited thereto, and the second electrode tab Sn placed at the outermost side in the electrode assembly 10 may include three or more tabs.

The second electrode tab Zn can have a slit, and the slit distance may be about 0.5 mm to about 5 mm. The tabs ZA1 and ZA2 constituting one second electrode tab Zn may not overlap each other on the same plane.

Each of the tabs ZA1 to ZA2 of the second electrode tab Zn can have a different width from the tab of each of the other second electrode tabs Z1-Zn−1. The width WD1 of each of the tabs ZA1 to ZA2 of the second electrode tab Zn can be less than the width WD2 of the tab of each of the other second electrode tabs Z1-Zn−1. The width WD2 of the tab of each of the other second electrode tabs Zn-Zn−1 can be about 1.5 times to about 2.5 times the width WD2 of each of the tabs ZA1 and ZA2 of the second electrode tab Zn.

Since the second electrode tab Zn placed at the outermost side is different from the other second electrode tabs Z1-Zn−1 in terms of the number of tabs, the winding end point and the winding start point can be accurately measured by recognizing the second electrode tab Zn placed at the outermost side. In addition, the widths of the tabs are detected to recognize the electrode tab Zn placed at the outermost side.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode assembly for a secondary battery, comprising:
a first electrode and a second electrode which are wound with a separator placed therebetween,
wherein the first electrode includes a first coated portion coated with an active material and a plurality of first electrode tabs T1-Tn protruding outwardly from the first coated portion, wherein n is a natural number greater than 2,
wherein the first electrode, when spread in a plane form, includes first to nth portions on which the first electrode tabs T1-Tn are respectively formed, wherein the first and nth portions of the first electrode respectively define innermost and outermost portions thereof, wherein each of the first electrode tabs T1-Tn includes at least one tab, and wherein the number of the first electrode tab Tn is different from the number of each of the first electrode tabs T1-Tn−1.

2. The electrode assembly of claim 1, wherein the first electrode tab Tn includes a plurality of tabs spaced apart from each other in a lateral direction, and wherein each of the electrode tabs T1-Tn−1 includes a single tab.

3. The electrode assembly of claim 2, wherein the tabs of the first electrode tab Tn do not overlap each other.

4. The electrode assembly of claim 3, wherein the tabs of the first electrode tab Tn are connected to the first electrode tab Tn−1 placed at a second outermost portion of the first electrode.

5. The electrode assembly of claim 3, wherein the distance between the tabs of the first electrode tab Tn is in the range of about 0.5 mm to about 5 mm.

6. The electrode assembly of claim 2, wherein each of the tabs of the first electrode tab Tn has a smaller width than the tab each of the other first electrode tabs T1-Tn−1.

7. The electrode assembly of claim 2, wherein the width of each of the first electrode tabs T1-Tn−1 is about 1.5 times to about 2.5 times the width of each of the tabs of the electrode tab Tn.

8. The electrode assembly of claim 1, wherein each of the first electrode tabs T1-Tn−1 includes a plurality of tabs spaced apart from each other in a lateral direction, and wherein the first electrode tab Tn includes a single tab.

9. The electrode assembly of claim 8, wherein the distance between the tabs of each of the first electrode tabs T1-Tn−1 is in the range of about 0.5 mm to about 5 mm.

10. The electrode assembly of claim 8, wherein the tab of the first electrode tab Tn has a greater width than each of the tabs of the other first electrode tabs T1-Tn−1.

11. The electrode assembly of claim 8, wherein the width of the tab of the first electrode tab Tn is about 1.5 times to about 2.5 times the width of each of the tabs of the electrode tabs T1-Tn−1.

12. A rechargeable battery, comprising:
an electrode assembly including a first electrode and a second electrode that are wound with a separator placed therebetween;
a case containing the electrode assembly; and
a cap plate connected to the case,
wherein the first electrode includes a first coated portion coated with an active material and a plurality of first electrode tabs T1-Tn protruding outwardly from the first coated portion, wherein n is a natural number greater than 2,
wherein the first electrode, when spread in a plane form, includes first to nth portions on which the first electrode tabs T1-Tn are respectively formed, wherein the first and nth portions of the first electrode respectively define innermost and outermost portions thereof, wherein each of the first electrode tabs T1-Tn includes at least one tab, and wherein the number of the first electrode tab Tn is different from the number of each of the first electrode tabs T1-Tn−1.

13. The rechargeable battery of claim 12, wherein the first electrode tab Tn includes a plurality of tabs spaced apart from each other in a lateral direction, and wherein each of the first electrode tabs T1-Tn−1 includes a single tab.

14. The rechargeable battery of claim 13, wherein the tabs of the first electrode tab Tn do not overlap each other.

15. The rechargeable battery of claim 14, wherein the tabs of the first electrode tab Tn are connected to the tab of the first electrode tab Tn−1 placed at a second outermost portion of the first electrode.

16. The rechargeable battery of claim 15, wherein the distance between the tabs of the first electrode tab Tn is in the range of about 0.5 mm to about 5 mm.

17. The rechargeable battery of claim 13, wherein each of the tabs of the first electrode tab Tn has a smaller width than the tab of each of the first electrode tabs T1−Tn−1.

18. The rechargeable battery of claim 12, wherein each of the first electrode tabs T1−Tn−1 includes a plurality of tabs spaced apart from each other in a lateral direction, and wherein the first electrode tab Tn includes a single tab.

19. The rechargeable battery of claim 18, wherein the tab of the first electrode tab Tn has a greater width than each of the tabs of the first electrode tabs T1−Tn−1.

20. The rechargeable battery of claim 18, wherein the width of the tab of the first electrode tab Tn is greater than the sum of the widths of the tabs of each of the first electrode tabs T1−Tn−1.

\* \* \* \* \*